United States Patent
Chiu

(10) Patent No.: US 11,462,860 B2
(45) Date of Patent: Oct. 4, 2022

(54) NOISE REDUCTION STRUCTURE AND TRANSMISSION DOCK HAVING THE SAME

(71) Applicant: GETAC TECHNOLOGY CORPORATION, Hsinchu County (TW)

(72) Inventor: Shang-Ming Chiu, Taipei (TW)

(73) Assignee: GETAC TECHNOLOGY CORPORATION, Hsinchu County (TW)

(\*) Notice: Subject to any disclaimer, the term of this patent is extended or adjusted under 35 U.S.C. 154(b) by 744 days.

(21) Appl. No.: 16/365,571

(22) Filed: Mar. 26, 2019

(65) Prior Publication Data
US 2020/0052443 A1   Feb. 13, 2020

Related U.S. Application Data

(60) Provisional application No. 62/716,878, filed on Aug. 9, 2018.

(51) Int. Cl.
| | | |
|---|---|---|
| *H01R 13/6581* | (2011.01) | |
| *H01R 13/6591* | (2011.01) | |
| *G06F 1/16* | (2006.01) | |

(52) U.S. Cl.
CPC ....... *H01R 13/6581* (2013.01); *G06F 1/1632* (2013.01); *H01R 13/6591* (2013.01)

(58) Field of Classification Search
CPC .. H01R 12/53; H01R 12/598; H01R 13/5845; H01R 9/0515; H01R 12/62; H01R 12/52; H01R 12/79; H01R 12/707; H01R 12/716; H01R 12/75; H01R 13/405; H01R 13/506; H01R 13/646; H01R 13/6464; H01R 13/6471; H01R 13/6585; H01R 13/6594; H01R 13/6597; H01R 13/6616; H01R 13/6666
USPC ....................................................... 455/3.01
See application file for complete search history.

(56) References Cited

U.S. PATENT DOCUMENTS

| | | | |
|---|---|---|---|
| 2004/0154815 A1* | 8/2004 | Gustafsson | H05K 9/0022 174/394 |
| 2008/0224932 A1* | 9/2008 | Suematsu | G06F 1/1656 343/702 |
| 2017/0069954 A1 | 3/2017 | Lui et al. | |

FOREIGN PATENT DOCUMENTS

CN   206211987 U   5/2017

\* cited by examiner

*Primary Examiner* — Ajibola A Akinyemi

(57) ABSTRACT

A noise reduction structure includes an antenna, a noise source, an electromagnetic conductor, and a grounding member. The antenna has a transmission and reception bandwidth. The noise source radiates an electromagnetic wave. Frequency of the electromagnetic wave falls within the transmission and reception bandwidth. The electromagnetic conductor is closer to the antenna than the noise source. The grounding member is disposed at the noise source in such a manner to face the antenna. The grounding member is electrically isolated from the electromagnetic conductor and forms a good grounding path to the noise source. Furthermore, a transmission dock with the noise reduction structure is provided.

11 Claims, 2 Drawing Sheets

NOISE REDUCTION STRUCTURE AND TRANSMISSION DOCK HAVING THE SAME

CROSS-REFERENCE TO RELATED APPLICATIONS

The present application claims the benefit of U.S. provisional Patent Application No. 62/716,878, filed on Aug. 9, 2018, the disclosure of which is hereby incorporated by reference herein in its entirety.

BACKGROUND OF THE INVENTION

Field of the Invention

The present disclosure relates to a noise reduction structure and a transmission dock having the same and, more particularly, to a noise reduction structure connected to a mobile device with an antenna and a transmission dock having the noise reduction structure.

Description of the Prior Art

If an electronic device with an antenna is connected to a transmission dock, such as a vehicular transmission dock, and uses the antenna to transmit and receive signals, communication quality will be affected by a noise source of the transmission dock. For instance, if the electronic device is using a wireless mouse and then is connected to a USB 3.0 dongle, the wireless mouse will be unusable.

It is because electromagnetic wave radiated as a result of application of spread spectrum by USB 3.0 fully occupies the transmission and reception bandwidth for antenna communication and thereby constitutes interference signals.

SUMMARY OF THE INVENTION

In view of the aforesaid drawbacks of the prior art, it is an objective of the present disclosure to provide a noise reduction structure and a transmission dock having the noise reduction structure.

In an embodiment of the present disclosure, the noise reduction structure comprises an antenna, a noise source, an electromagnetic conductor and a grounding member. The antenna has a transmission and reception bandwidth. The noise source radiates an electromagnetic wave. Frequency of the electromagnetic wave falls within the transmission and reception bandwidth. The electromagnetic conductor is closer to the antenna than the noise source. The grounding member is disposed at the noise source in such a manner to face the antenna. The grounding member is electrically isolated from the electromagnetic conductor and forms a good grounding path to the noise source.

In another embodiment of the present disclosure, a transmission dock having the noise reduction structure comprises a noise reduction structure, a plastic casing and a circuit board. The noise reduction structure comprises an antenna, a noise source, an electromagnetic conductor and a grounding member. The antenna has a transmission and reception bandwidth. The noise source radiates an electromagnetic wave. Frequency of the electromagnetic wave falls within the transmission and reception bandwidth. The electromagnetic conductor is closer to the antenna than the noise source. The grounding member is disposed at the noise source in such a manner to face the antenna. The grounding member is electrically isolated from the electromagnetic conductor and forms a good grounding path to the noise source. The plastic casing has a receiving space, a plate and a securing structure. The securing structure is disposed on an outer side of the plate. The receiving space is disposed on an inner side of the plate. The circuit board is receivedly disposed in the receiving space of the plastic casing. The noise source is disposed on the circuit board. The grounding member is disposed in the receiving space of the plastic casing. The circuit board and the grounding member are connected by a plurality of grounding components to achieve grounding.

In yet another embodiment of the present disclosure, a transmission dock having the noise reduction structure comprises a noise reduction structure, a casing and a circuit board. The noise reduction structure comprises an antenna, a noise source, an electromagnetic conductor and a grounding member. The antenna has a transmission and reception bandwidth. The noise source radiates an electromagnetic wave. Frequency of the electromagnetic wave falls within the transmission and reception bandwidth. The electromagnetic conductor is closer to the antenna than the noise source. The grounding member is disposed at the noise source in such a manner to face the antenna. The grounding member is electrically isolated from the electromagnetic conductor and forms a good grounding path to the noise source. The casing has a plastic body, a receiving space and a securing structure. The grounding member and the plastic body are integrally formed. The securing structure is disposed on an outer side of the plastic body. The receiving space is disposed on an inner side of the plastic body. The circuit board corresponds in position to the grounding member and thus is receivedly disposed in the receiving space of the casing. The circuit board and the grounding member are connected by a plurality of grounding components to achieve grounding, wherein the noise source is disposed on the circuit board.

Objectives, technical features, advantages and benefits of the present disclosure are hereunder illustrated with specific embodiments, depicted with appended drawings, and described in detail below.

DETAILED DESCRIPTION OF THE EMBODIMENTS

Figure 1:
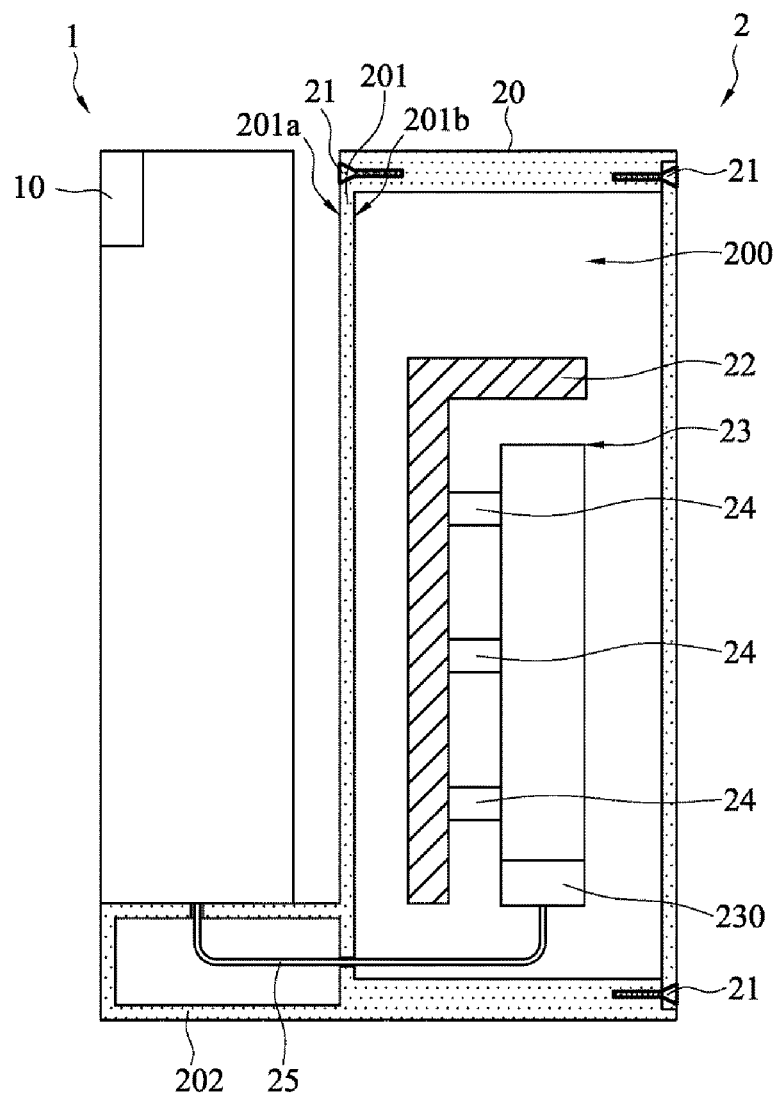
FIG. 1 is a schematic view of a transmission dock having a noise reduction structure according to an embodiment of the present disclosure.

Referring to FIG. 1, there is shown a schematic view of a transmission dock 2 having a noise reduction structure according to an embodiment of the present disclosure. When an electronic device 1 with an antenna 10 is connected to the transmission dock 2, such as a vehicular transmission dock, and uses the antenna 10 to transmit and receive signals, owing to the noise reduction structure, the communication quality is not affected by a noise source 230 inside the transmission dock 2.

In this embodiment, the noise reduction structure comprises an antenna 10, a noise source 230, an electromagnetic conductor 21 and a grounding member 22. The electronic device 1 with the antenna 10 is, but is not limited to, a notebook, tablet, smartphone, PDA, multimedia playing device, and mobile device. The antenna 10 has a transmission and reception bandwidth for wireless transmission. For instance, the transmission and reception bandwidth for use by wireless transmission technology falls within the range of 2.412 GHz to 2.462 GHz, but the present disclosure is not limited thereto. The noise source 230 radiates an electromagnetic wave. For instance, the noise source 230 is, but is not limited to, a USB 3.0 communication module. The noise source 230 is disposed on a circuit board 23 and generates an electromagnetic wave of a frequency, i.e., 2.5 GHz, while operating. Therefore, frequency of the electromagnetic wave falls within the transmission and reception bandwidth of the antenna 10.

The electromagnetic conductor 21 is closer to the antenna 10 than the noise source 230. The electromagnetic conductor 21 serves as a medium for transmission of the electromagnetic wave; hence, the electromagnetic wave radiated from the noise source 230 is transmitted outward to the vicinity of the antenna 10 through the electromagnetic conductor 21 and thus deteriorates communication quality of the antenna 10 of the electronic device 1, either when the noise reduction structure is not equipped with the grounding member 22, or when the noise reduction structure is equipped with the grounding member 22 and the electromagnetic conductor 21 is connected to the grounding member 22. For instance, the electromagnetic conductor 21 is a metallic screw disposed on a plastic casing 20 and adapted to transmit the electromagnetic wave outward.

In this embodiment, the noise reduction structure having the grounding member 22 is not only disposed on the circuit board 23 which the noise source 230 is located at but also faces the antenna 10. The grounding member 22 is electrically insulated from the electromagnetic conductor 21. The grounding member 22 is electrically connected to the noise source 230. There is a good grounding path (well grounding) between the grounding member 22 and the noise source 230. The good grounding path enables L in feature impedance (R+jωL) approaches zero. Therefore, feature impedance does not change significantly with the frequency of the electromagnetic wave. In short, the grounding member 22 is electrically insulated from the electromagnetic conductor 21 for two reasons as follows: the electromagnetic wave which might otherwise interfere with the antenna 10 is restricted to the vicinity of the noise source 230; the electromagnetic conductor 21 in the vicinity of the antenna 10 is grounded to prevent the electromagnetic wave from being transmitted to the vicinity of the antenna 10 through the electromagnetic conductor 21. In an embodiment, the grounding member 22 is, but is not limited to, a metallic plate. For instance, the cross section of the metallic plate is panel-shaped, L-shaped, C-shaped or U-shaped, but the present disclosure is not limited thereto.

Given the aforesaid structural features, the electromagnetic wave radiated from the noise source 230 is shielded by the grounding member 22 such that the electromagnetic wave cannot be transmitted through the electromagnetic conductor 21 and thus cannot interfere with the antenna 10 of the electronic device 1. The noise reduction structure has advantages as follows: a good grounding path is formed between the grounding member 22 and the noise source 230 which generates interference signals; and the grounding member 22 shields the noise source 230 which generates interference signals such that extra electromagnetic wave which might otherwise interfere with signals of the antenna 10 can return, for example, be transmitted to the circuit board (PCB) 23 of the transmission dock 2 rather than be transmitted outward. Furthermore, the area or volume of the grounding member 22 is minimized to therefore prevent the electromagnetic wave radiated from the noise source 230 (USB 3.0) from being transmitted to the vicinity of the antenna 10. Furthermore, the grounding member 22 and the electromagnetic conductor 21 which does not generate interference signals are electrically isolated from each other to prevent the electromagnetic wave from being transmitted to the electromagnetic conductor 21 through the grounding member 22 and thereby affecting the antenna 10. Furthermore, the grounding member 22 must be as far from the antenna 10 as possible to prevent the electromagnetic wave radiated from the noise source 230 from being transmitted to the vicinity of the antenna 10.

Unlike conventional noise reduction structures which maximize a grounding path, the noise reduction structure according to an embodiment of the present disclosure minimizes the grounding path of the grounding member 22 to prevent the electromagnetic wave radiated from the noise source 230 from radiating outward. The noise reduction structure according to an embodiment of the present disclosure is further advantageous in that even if an extra grounding path is formed, the extra grounding path must be as far from the antenna 10 as possible to minimize the communication interference imposed by electromagnetic wave radiation on the antenna 10.

Referring to FIG. 1, the transmission dock 2 having the noise reduction structure according to another embodiment of the present disclosure is described below. In this embodiment, the transmission dock 2 comprises a noise reduction structure, a plastic casing 20 and a circuit board 23. Technical features, advantages, benefits and related embodiments of the noise reduction structure are described above and thus are not reiterated for the sake of brevity.

The plastic casing 20 has a receiving space 200, a plate 201 and a securing structure 202. The securing structure 202 is disposed on an outer side 201*a* of the plate 201. The receiving space 200 is disposed on an inner side 201*b* of the plate 201. In an embodiment, the grounding member 22 is mounted on the inner side 201*b* of the plate 201 of the plastic casing 20, but the present disclosure is not limited thereto. In this embodiment, a plurality of electromagnetic conductors 21 is a plurality of screw components mounted on the plastic casing 20. The securing structure 202 holds the electronic device 1 having the antenna 10. The electronic device 1 is fixedly disposed on the securing structure 202, with the antenna 10 positioned distal to the grounding member 22.

The circuit board 23 is receivedly disposed in the receiving space 200 of the plastic casing 20. The noise source 230 is generated from electronic components mounted on the circuit board 23 (only one of the electronic components is shown.) The grounding member 22 is disposed in the receiving space 200 of the plastic casing 20. The circuit board 23 and the grounding member 22 are connected by a plurality of grounding components 24 to achieve grounding. In an embodiment, the scope of extension of the grounding member 22 is restricted to the vicinity of the circuit board 23, for example, within a 5 cm radius centered at the circuit board 23. In an embodiment, the area of the grounding member 22 is greater than or equal to the area of the circuit board 23 and is less than two times the area of the circuit board 23. The area of the grounding member 22 is minimized to prevent the electromagnetic wave radiated from the noise source 230 (such as USB 3.0 communication module) from being transmitted to the vicinity of the antenna 10.

Given the aforesaid structural features, the noise reduction structure of the transmission dock 2 has advantages as follows: the grounding member 22 forms a good grounding path to the noise source 230 which generates interference signals; and the grounding member 22 shields the noise source 230 which generates interference signals. Therefore, the present disclosure has benefits and advantages as described above.

Furthermore, the circuit board 23 selectively comprises a cable 25. The cable 25 is electrically connected to the grounding member 22 through the circuit board 23. The cable 25 is disposed at one end of the circuit board 23 and positioned distal to the antenna 10. The connections between the cable 25, the noise source 230 (such as USB 3.0 communication module), the circuit board 23 and the grounding member 22 must be integrally formed, that is, a good grounding path must be formed when grounding is achieved, so as to prevent the electromagnetic wave radiated from the noise source 230 from being transmitted to the vicinity of the antenna 10.

Figure 2:
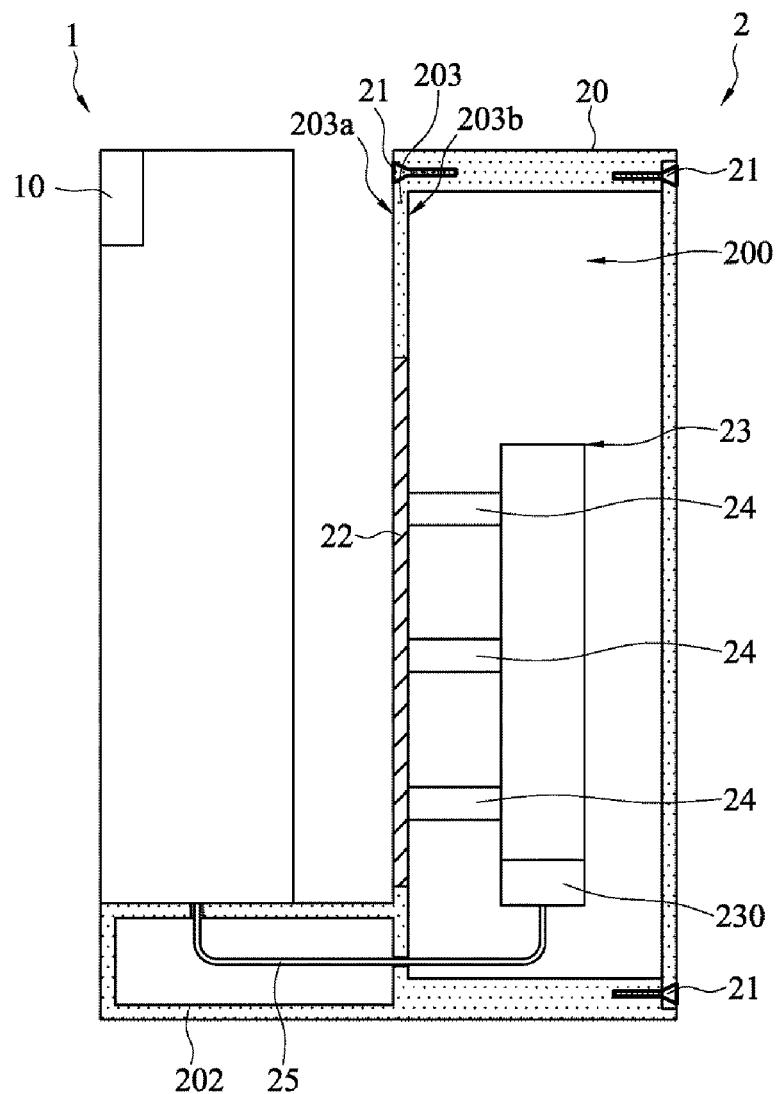
FIG. 2 is a schematic view of the transmission dock having the noise reduction structure according to an embodiment of the present disclosure.

Referring to FIG. 2, the transmission dock 2 having a noise reduction structure according to yet another embodiment of the present disclosure is described below. The transmission dock 2 comprises a noise reduction structure, a casing 20 and a circuit board 23. Technical features, advantages, benefits and related embodiments of the noise reduction structure are described above and thus are not reiterated for the sake of brevity.

The casing 20 has a plastic body 203, a receiving space 200 and a securing structure 202. The grounding member 22 and the plastic body 203 are integrally formed. The securing structure 202 is disposed on an outer side 203a of the plastic body 203. The receiving space 200 is disposed on an inner side 203b of the plastic body 203. In this embodiment, a plurality of electromagnetic conductors 21 is a plurality of screw components mounted on the casing 20. The securing structure 202 holds the electronic device 1 having the antenna 10. The electronic device 1 is fixedly disposed on the securing structure 202, with the antenna 10 positioned distal to the grounding member 22.

The circuit board 23 corresponds in position to the grounding member 22. The circuit board 23 is receivedly disposed in the receiving space 200 of the casing 20. The noise source 230 is generated from electronic components mounted on the circuit board 23 (only one of the electronic components is shown.) The circuit board 23 and the grounding member 22 are connected by a plurality of grounding components 24 to achieve grounding. In this embodiment, the grounding member 22 is disposed between the circuit board 23 and the securing structure 202. In an embodiment, the scope of extension of the grounding member 22 is restricted to the vicinity of the circuit board 23, for example, within a 5 cm radius centered at the circuit board 23. In an embodiment, the area of the grounding member 22 is greater than or equal to the area of the circuit board 23 and is less than two times the area of the circuit board 23. The area of the grounding member 22 is minimized to prevent the electromagnetic wave radiated from the noise source 230 (such as USB 3.0 communication module) from being transmitted to the vicinity of the antenna 10.

Given the aforesaid structural features, the noise reduction structure of the transmission dock 2 has advantages as follows: the grounding member 22 forms a good grounding path to the noise source 230 which generates interference signals; and the grounding member 22 shields the noise source 230 which generates interference signals. Therefore, the present disclosure has benefits and advantages as described above.

Furthermore, the circuit board 23 selectively comprises a cable 25. The cable 25 is electrically connected to the grounding member 22 through the circuit board 23. The cable 25 is disposed at one end of the circuit board 23 and positioned distal to the antenna 10. The connections between the cable 25, the noise source 230 (such as USB 3.0 communication module), the circuit board 23 and the grounding member 22 must be integrally formed, that is, a good grounding path must be formed when grounding is achieved, so as to prevent the electromagnetic wave radiated from the noise source 230 from being transmitted to the vicinity of the antenna 10.

In conclusion, in an embodiment of the present disclosure, a noise reduction structure and a transmission dock having the noise reduction structure have advantages as follows: a good grounding path is formed between the grounding member and the noise source which generates interference signals; and the grounding member shields the electromagnetic wave radiated from the noise source such that extra electromagnetic wave which might otherwise interfere with signals of the antenna can return, for example, be transmitted to a circuit board of the transmission dock rather than be transmitted outward. Furthermore, the area or volume of the grounding member is minimized to therefore prevent the electromagnetic wave radiated from the noise source from being transmitted to the vicinity of the antenna. Similarly, the grounding member and an electromagnetic conductor which does not generate interference signals are electrically isolated from each other. Furthermore, the grounding member must be as far from the antenna as possible to prevent the electromagnetic wave radiated from the noise source from being transmitted to the vicinity of the antenna. Unlike conventional noise reduction structures which maximize a grounding path, the noise reduction structure according to an embodiment of the present disclosure minimizes the grounding path of the grounding member to prevent the electromagnetic wave radiated from the noise source from radiating outward, so as to minimize the communication interference imposed by the electromagnetic wave on the antenna.

Although the present disclosure is disclosed above by embodiments, the embodiments are not restrictive of the present disclosure. Some changes and modifications made by persons skilled in the art to the embodiments without departing from the spirit and scope of the present disclosure must be deemed falling within the scope of the present disclosure. Accordingly, the legal protection for the present disclosure should be defined by the appended claims.

What is claimed is:
1. A transmission dock, comprising:
an antenna having a transmission and reception bandwidth;
a noise source radiating an electromagnetic wave, wherein frequency of the electromagnetic wave falls within the transmission and reception bandwidth;
an electromagnetic conductor being closer to the antenna than the noise source;
a grounding member disposed at the noise source in such a manner to face the antenna and electrically isolated from the electromagnetic conductor to form a good grounding path to the noise source;
a plastic casing having a receiving space, a plate and a securing structure, the securing structure being disposed on an outer side of the plate, and the receiving space being disposed on an inner side of the plate; and
a circuit board disposed in the receiving space of the plastic casing, with the noise source disposed on the circuit board, with the grounding member disposed in the receiving space of the plastic casing, wherein the circuit board and the grounding member are connected by a plurality of grounding components to achieve grounding.

2. The transmission dock of claim 1, wherein the grounding member is mounted on the inner side of the plate of the plastic casing.

3. The transmission dock of claim 1, wherein scope of extension of the grounding member is restricted to vicinity of the circuit board.

4. The transmission dock of claim 1, wherein area of the grounding member is greater than or equal to area of the circuit board and is less than two times the area of the circuit board.

5. The transmission dock of claim 1, wherein the securing structure holds an electronic device having the antenna, and the electronic device is fixedly disposed on the securing structure, with the antenna positioned distal to the grounding member.

6. The transmission dock of claim 5, wherein the circuit board further comprises a cable electrically connected to the grounding member, and the cable is disposed at an end of the circuit board and positioned distal to the antenna.

7. A transmission dock, comprising:
- an antenna having a transmission and reception bandwidth;
- a noise source radiating an electromagnetic wave, wherein frequency of the electromagnetic wave falls within the transmission and reception bandwidth;
- an electromagnetic conductor being closer to the antenna than the noise source;
- a grounding member disposed at the noise source in such a manner to face the antenna and electrically isolated from the electromagnetic conductor to form a good grounding path to the noise source;
- a casing having a plastic body, a receiving space and a securing structure, wherein the grounding member and the plastic body are integrally formed, with the securing structure disposed on an outer side of the plastic body, with the receiving space disposed on an inner side of the plastic body; and
- a circuit board corresponding in position to the grounding member and disposed in the receiving space of the casing, with a plurality of grounding components connected between the circuit board and the grounding member to achieve grounding, wherein the noise source is disposed on the circuit board.

8. The transmission dock of claim 7, wherein area of the grounding member is greater than or equal to area of the circuit board and is less than two times the area of the circuit board.

9. The transmission dock of claim 7, wherein the grounding member is disposed between the circuit board and the securing structure.

10. The transmission dock of claim 7, wherein the securing structure holds an electronic device having the antenna, and the electronic device is fixedly disposed on the securing structure, with the antenna positioned distal to the grounding member.

11. The transmission dock of claim 10, wherein the circuit board further comprises a cable electrically connected to the grounding member, and the cable is disposed at an end of the circuit board and positioned distal to the antenna.

* * * * *